Feb. 1, 1949. R. D. NELSON ET AL 2,460,467
SYSTEM OF CONTROLLING ELECTRIC LINES
Filed Aug. 16, 1944 8 Sheets-Sheet 2
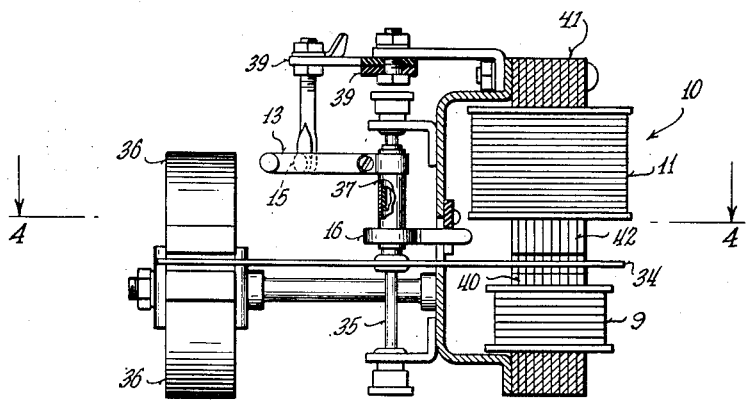
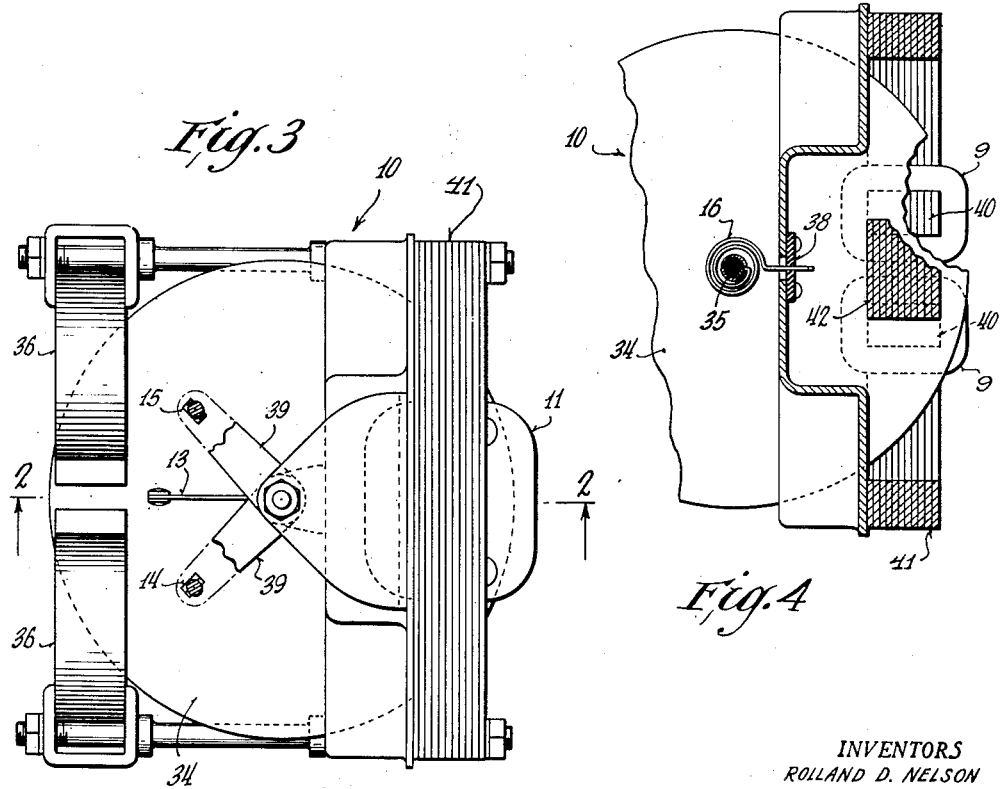
INVENTORS
ROLLAND D. NELSON
EDWIN A. LINK
BY
ATTORNEY.

Feb. 1, 1949.  R. D. NELSON ET AL  2,460,467
SYSTEM OF CONTROLLING ELECTRIC LINES
Filed Aug. 16, 1944  8 Sheets-Sheet 3

INVENTORS
ROLLAND D. NELSON
EDWIN A. LINK
BY
Arthur R. Woolfolk
ATTORNEY.

INVENTORS
ROLLAND D. NELSON
EDWIN A. LINK
BY
ATTORNEY.

INVENTORS
ROLLAND D. NELSON
EDWIN A. LINK

INVENTORS
ROLLAND D. NELSON
EDWIN A. LINK
BY
ATTORNEY.

INVENTORS
ROLLAND D. NELSON
EDWIN A. LINK

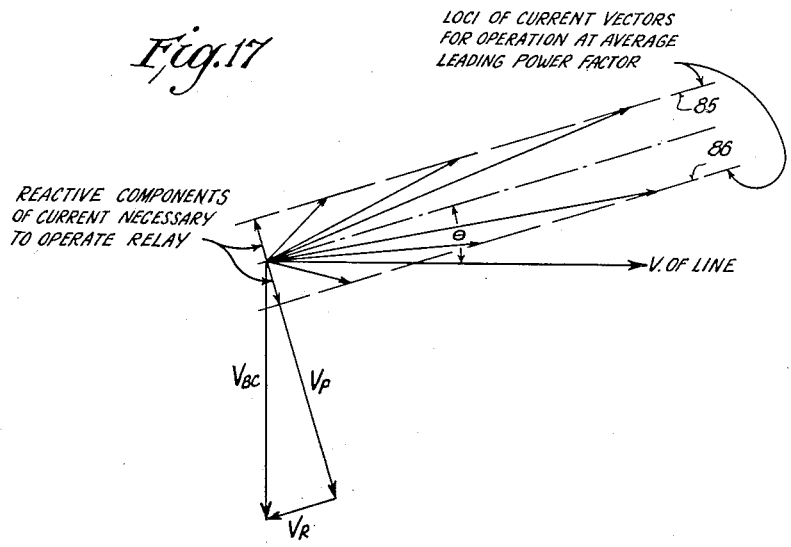
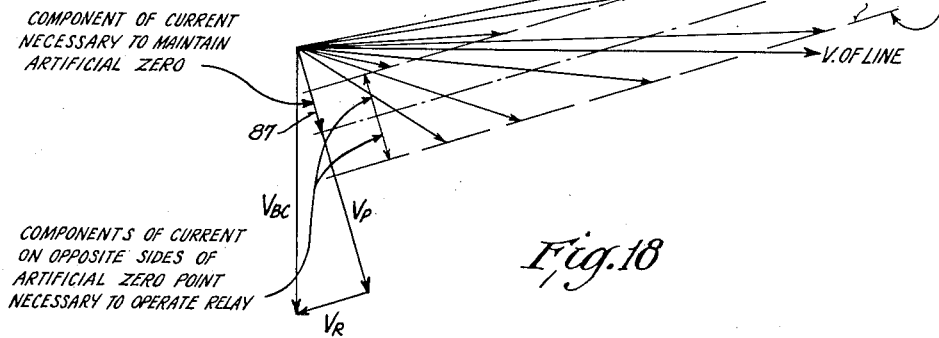

Patented Feb. 1, 1949

2,460,467

UNITED STATES PATENT OFFICE 2,460,467

SYSTEM OF CONTROLLING ELECTRIC LINES

Rolland D. Nelson, Hales Corners, and Edwin A. Link, South Milwaukee, Wis., assignors to Line Material Company, Milwaukee, Wis., a corporation of Delaware Application August 16, 1944, Serial No. 549,774

7 Claims. (Cl. 323—105)

This invention relates to a system of controlling power lines or other electrical circuits.

Objects of this invention are to provide a system of control for power or other electrical lines which is responsive to reactive power and which controls switching means particularly switching means for switching in or switching out capacitors or otherwise controlling means for producing a capacitive effect on the line to improve the power factor.

Further objects are to provide a system of control for power lines in which a relay is provided responsive to the wattless component of the current and so arranged that it will control the switching in or switching out of capacitors or otherwise control means for producing a capacitive effect on the line to thus improve the power factor of the line, the relay being so arranged that it is a double acting relay and operates on either side of either a true zero point or an artificial zero point on either side of which the relay will operate to change the condition of the line.

In greater detail, further objects of this invention are to provide a system of control and an adjustable relay therefor which may be adjusted to cause the relay to respond to different current values at different phase displacements and to thus determine certain loci defining the field within which response will be had so that the relay may respond to a small current value at a given phase displacement or a large current value at a smaller phase displacement.

Further objects are to provide a system of regulating or controlling power lines by means responsive to the reactive component of the current and which is so arranged that not only is the capacity of the line varied to improve the power factor but also which is so arranged that an increasing voltage may be applied to the line when the load increases without the use of voltage compensators or other auxiliary devices of this general nature.

Further objects are to provide a system of control which has the desirable characteristics hereinabove set forth and which is so arranged that it will not respond to transients or other short period disturbances but which will correct for improper power factor conditions, and which also is so arranged that it is inherently stable and will not go through cyclic oscillations but will make the necessary adjustment in accordance with line conditions and thereafter remain quiescent until a further change in the line conditions necessitates a further adjustment.

Embodiments of the invention are shown in the accompanying drawings, in which:

Figure 2 is a sectional view through the main relay for the system, such view being taken approximately on the line 2—2 of Figure 3.

Figure 3 is a plan view of the relay with parts broken away.

Figure 4 is a horizontal fragmentary sectional view approximately on the line 4—4 of Figure 2.

Figure 17 is a vector diagram corresponding to Figure 16 but in which the impedance of the condenser is greater than the impedance of the voltage element of the relay.

Figure 18 is a vector diagram corresponding to the setting of the relay as shown in Figure 12 and the circuit arrangement as shown in Figure 15.

Figure 1:
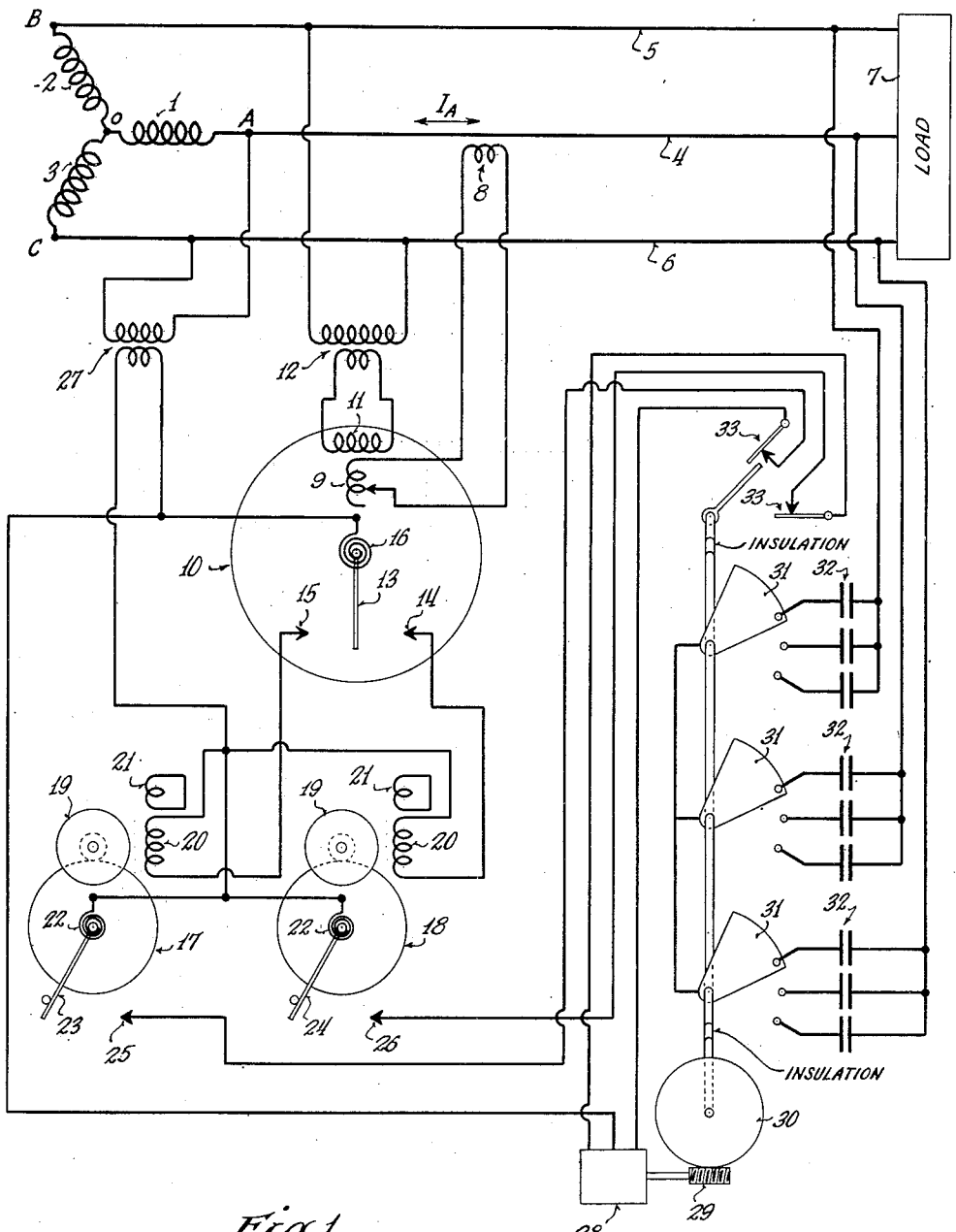
Figure 1 shows the invention applied to a three phase system.

Referring to Figure 1, it will be seen that 1, 2 and 3 indicate the secondaries of a transformer, the primaries having been omitted, the three power lines being represented by the reference characters 4, 5 and 6 and the load being diagrammatically indicated at 7. A current transformer indicated generally at 8 is connected to the tapped current coil 9 of the main relay indicated generally by the reference character 10. It is to be noted that the relay 10 is a relay of unvarying sensitivity, for any given adjustment. The voltage coil 11 of the relay is supplied from a step-down transformer 12. The relay has a movable contact arm 13 which, when adjusted as indicated in Figure 1, occupies a neutral position intermediate the contacts 14 and 15. The movable contact arm 13 is normally held at zero position be means of the spiral spring 16.

Figure 5:
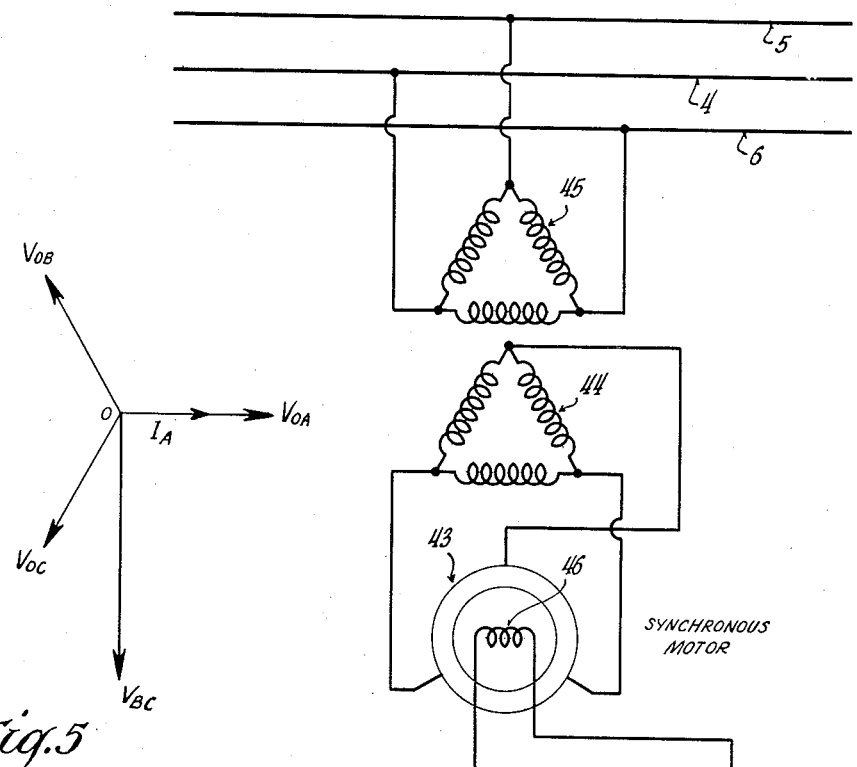
Figure 5 is a vector diagram corresponding to the system shown in Figure 1.

The arrangement is such that the relay will respond to the wattless component of the current flowing in the power system, for it will be noted from reference to the vector diagram of Figure 5 that the voltage in the three secondaries 1, 2 and 3 between the point 0 and the points A, B and C are represented by the vectors $V_{OA}$, $V_{OB}$ and $V_{OC}$. The voltage across the points B and C is represented by the vector $V_{BC}$ and it will be seen that the vector $V_{BC}$ is at right angles to the current $I_A$ in the power line 4 of Figure 1 when the system has a unity power factor or, in other words, is supplying a straight resistance load or its equivalent.

The detailed operation of the relay will be described hereinafter.

The main relay 10 controls a pair of time delay relays indicated generally at 17 and 18. Each of these time delay relays may be of any desired construction. In the form chosen for illustration a shaded coil motor has been shown for each of the relays and has its armature indicated by the reference character 19, its active coil by the reference character 20, and the shading coil by the reference character 21. The motor is geared down in each instance so as to drive a contact arm against the effect of a spiral spring 22. The contact arm of the time delay relay 17 is indicated by the reference character 23 and that of the time delay relay 18 by the reference character 24. Suitable stops are provided as indicated for determining the initial or zero position of the contact arms 23 and 24. These contact arms are adapted to respectively engage the stationary contacts 25 and 26. When the time delay relays are not energized, the springs return their contact arms to their zero or initial point as shown in Figure 1. Power is furnished for driving the time delay relays by means of the step-down transformer 27, one side of the secondary of which is connected to the contact arm 13 of the main relay 10 and the other side of which is connected to one side of the windings 20 of the time delay relays 17 and 18, the other side of the windings 20 being connected respectively to the contacts 15 and 14 of the main relay 10.

The time delay relays 17 and 18 control a reversible motor 28, the motor rotating in one direction when one relay is closed and in the other direction when the other relay is closed. The motor 28 may be of any suitable type, a two-winding motor having been diagrammatically indicated and supplied from the secondary of the transformer 27 through one or the other of the contact arms 23 and 24 when in engagement with the corresponding stationary contacts 25 and 26.

The motor 28 drives a plurality of wiping switch blades or sectors 31 through the medium of a worm 29 and worm wheel 30. The switch blades are adapted to successively connect capacitors 32 across the power lines 4, 5 and 6, the arrangement being such as to produce a Y connection of the capacitor banks though a delta connection could be employed if desired. Limit switches indicated generally at 33 are provided for determining the extreme limits of motion of the switch blades or sector contact members 31.

From the description thus far given it is apparent that when unity power factor exists in the system, the current vector $I_A$ is at right angles to the voltage vector $V_{BC}$, see Figure 5, and consequently no tendency to rotate the contact arm 13 is imparted to the main relay 10. If the load on the line becomes inductive, the contact arm 13 of the main relay 10 will move in a clockwise direction and will contact the contact 15 and thus energize the time delay relay 17. The movable arm 23 of the time delay relay 17 will engage the contact 25 and will cause rotation of the motor 28 in a direction to connect one or more of the capacitors 32 to the line. In the position shown in Figure 1 one capacitor of each bank has been connected in the line. If the additional capacity added to the line substantially balances the inductive reactance, the contact arm 13 of the main relay 10 will move back towards its zero position under the influence of the spring 16 and will cause deenergization of the time delay relay 17 whose contact arm 23 will move back to its zero point away from its contact 25, thus deenergizing the motor 28.

If any additional inductive load is thrown on the line, the relay 10 will again cause energization of the time delay relay 17 and an additional capacitor 32 of each bank will be connected to the line. On the other hand, if the line becomes less inductive, the contact arm 13 of the main relay 10 will move to the right and will engage the contact 14 thereof and energize the time delay relay 18. The contact arm 24 of the time delay relay 18 will engage the stationary contact 26 thereof and cause reverse rotation of the motor 28, thus removing one or more capacitors of each bank from the line so as to reestablish a balanced condition on the line and improve the power factor. If at any one operation more than one capacitor is required to secure a balanced condition, the contact arm 13 of the main relay 10 will engage the contact 15 and remain in engagement therewith until the requisite number of capacitors has been connected to the line. Similarly, if the condition of the system requires the removal of more than one capacitor, the contact arm 13 of the main relay will engage the contact 14 and remain in contact therewith until substantial balance of the line has been reestablished.

The main relay will not cause operation of one or the other of the time delay relays for every unbalanced condition of the line, for the unbalance has to be of a certain amount, or, in other words, the wattless component has to be of a certain value to overcome the torque produced by the spring 16 and of a certain duration as there is a certain time delay for the main relay 10. After the main relay has functioned, the time delay relay 17 or 18 provides an additional delay.

The effect of the spring 16 of the main relay 10 can be varied by the adjustment of the position of the contacts 14 and 15 in a manner hereinafter described.

The main relay 10 is illustrated in Figures 2, 3 and 4 and comprises essentially a non-magnetic conductive circular disk 34 rigid with a revoluble spindle 35 mounted in suitable bearings, the disk being arranged to pass between the poles of drag magnets 36. The spring 16 may be adjustable but it is shown as non-adjustable. Its inner end is secured to a conducting sleeve 37 insulated from the spindle 35 and connected to the contact arm 13, see Figure 2. The outer end of the spring 16 is held by an insulating member 38, see Figure 4, and is adapted to have one of the conductors attached thereto as diagrammatically shown in Figure 1. The contacts 14 and 15 are adapted to have flexible leads connected thereto and the position of the contacts may be adjusted as they are carried by insulating arms 39 which may be swung about an axis coaxial with the spindle 35. The purpose of the adjustability of the contacts 14 and 15 will appear hereinafter. The current coil 9 is in reality composed of two coils wound on two spaced cores 40 of the laminated magnetic frame indicated generally at 41. The voltage coil 11 is wound on a core 42 of the magnetic frame 41 located above the cores 40 and having its axis between the axes of the cores 40. The core 42 and the cores 40 are respectively located above and below the metal disk 34.

Figure 6:
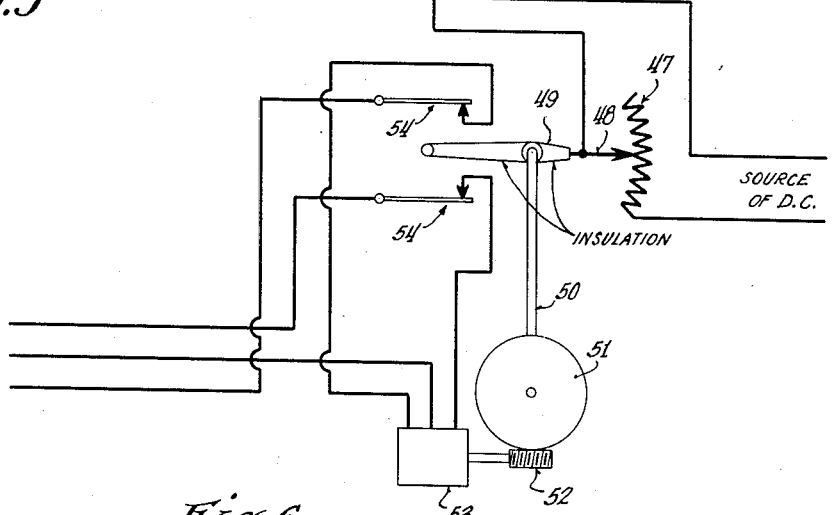
Figure 6 shows a modification of Figure 1 in which a synchronous condenser is employed in place of the capacitors shown in Figure 1.

Other means may be used to provide the capacitive effect. For example as shown in Figure 6, an over excited synchronous motor indicated generally by the reference character 43 may have its stator windings connected to the secondaries 44 of a three phase transformer whose primaries 45 are connected to the mains 4, 5 and 6. The rotating field coil 46 of the over excited synchronous motor is connected through a rheostat 47 with a source of direct current. The excitation of the field of the synchronous motor is controlled by the movable contact arm 48 of the rheostat. This contact arm is carried by an insulating lever 49 rigid with the shaft 50 of a worm wheel 51. The worm wheel is driven by means of the worm 52 on the shaft of the motor 53. The motor 53 corresponds to the motor 28 and is connected up to the time delay relays 17 and 18 of Figure 1 in exactly the same manner as described in connection with such figure. Limit switches 54 are provided to determine the extreme limits of the motion of the contact arm 48. It is apparent from the description hereinabove that when there is a wattless component of sufficient magnitude to operate the main relay 10, see Figure 1, the motor 53, see Figure 6, will be energized and will adjust the contact arm 48 to the appropriate place to correspondingly control the excitation of the over excited synchronous motor and thus vary its capacitive effect.

From an examination of the vector diagram of Figure 5 it is apparent that when there is unity power factor that there is no component of the current $I_A$ in line with the voltage vector $V_{BC}$. However, as soon as there is any deviation from unity power factor, there is a wattless component of the current which is in line with the voltage vector $V_{BC}$ and consequently torque is produced on the shaft of the main relay 10, see Figure 1. The amount of the wattless component necessary to actuate the relay is determined by the strength of the spring 16 and also by the distance of the contacts 14 and 15 from the neutral position of the contact arm 13 of the main relay. Obviously if the contacts 14 and 15 are very close to the zero position of the contact arm 13, a small value of wattless component current will be sufficient to actuate the main relay and consequently to actuate the automatic mechanism. On the other hand, if the contacts 14 and 15 are moved a considerable distance away from the zero or neutral position of the contact arm 13, an increased torque is required in order to overcome the spring 16 and consequently a larger component of wattless current is required. It is within the province of this invention to make the spring adjustable if desired, though the equivalent effect is obtained by moving the contacts 14 and 15 towards or from the neutral position of the contact arm 13. Additionally it is to be noted that the current coil is tapped and any desired number of turns can, therefore, be employed to thus give an additional adjustment determining the magnitude of the wattless component to which the relay will respond.

It is to be understood that in any of the three phase systems to which the invention is applied any number of units consisting of the current coil 9 and voltage coil 11 may be provided to act upon the same or different disks carried by the spindle 35. Also it is to be understood that a conducting drum or drums could be employed in place of the disk or disks. A single unit is sufficient if the load on each of the three phases is the same. However, if unsymmetrical loads are encountered it is preferable to provide two or more units so that the entire condition of the three phase line will be represented by the action of the main relay. For the sake of simplicity, one unit has been shown.

While time delay relays 17 and 18 have been shown, it is obvious that quick acting relays could be employed. Time delay relays are preferable to prevent the system from responding to transients or very temporary changes in the condition of the line.

Figure 7:
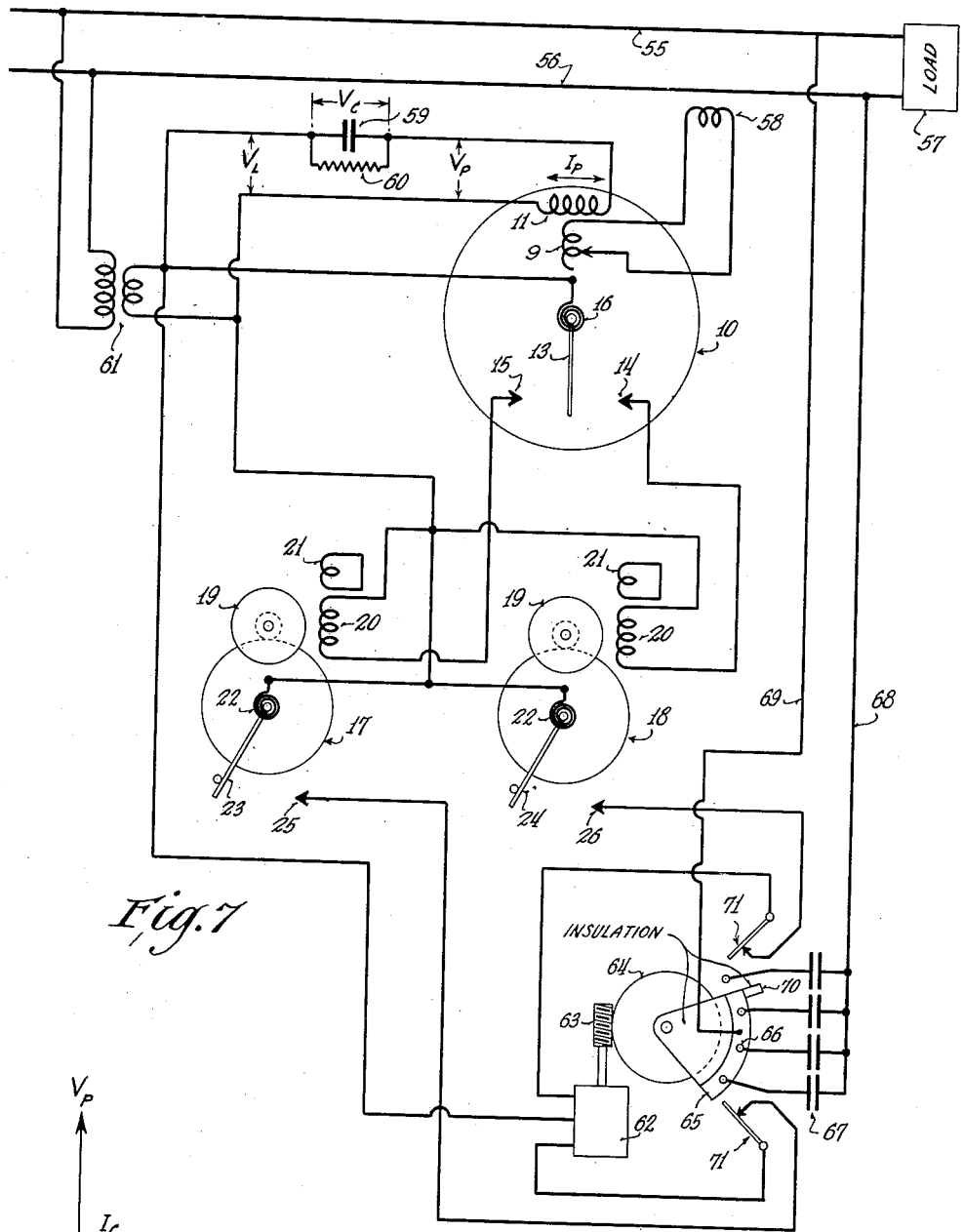
Figure 7 shows the invention applied to a single phase system.

The invention may be applied to a single phase system. Figure 7 shows a single phase system, the power lines being represented by the reference characters 55 and 56 and the load by the reference character 57. The main relay 10 and the auxiliary relays 17 and 18 are exactly like those previously described and the same reference characters are used to designate their parts.

Figure 8:
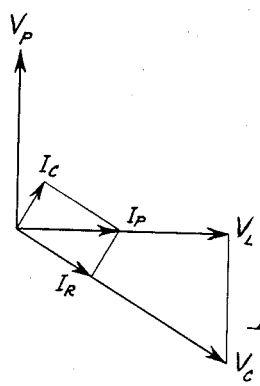
Figure 8 is a vector diagram for Figure 7.

The current coil 9 of the main relay 10 is connected to the secondary of a current transformer 58. However, in order to have the right angle relation between the voltage applied to the voltage coil 11 and the current in the current coil 9, it is necessary to form a network in the circuit connected to the voltage coil 11. This network consists of a condenser 59 bridged by a resistance 60 and connected in circuit with the voltage coil 11. The secondary of a step-down transformer 61 supplies current to this circuit. The voltage across the voltage coil is represented in the vector diagram of Figure 8 as $V_P$, the voltage across the condenser 59 and the resistance 60 by $V_C$, and the voltage at the secondary of the transformer 61 by $V_L$. The vectors $I_P$, $I_C$ and $I_R$ represent the current flowing in the potential coil 11, the condenser 59 and the resistor 60, respectively. The constants of the circuit are so chosen that the angular relation shown in the vector diagram of Figure 8 is obtained. In other words, the voltage $V_P$ across the voltage element or voltage coil 11 of the relay 10 is at right angles to the voltage of the secondary of the transformer 61 and consequently is at right angles to the voltage of the power system. In view of the fact that for unity power factor the current in the current coil 9 is in phase with the voltage of the system, it is apparent that the voltage impressed on the voltage coil 11 is 90° out of phase with the current in the current coil 9 at unity power factor and therefore no torque is exerted on the relay 10.

A reversible motor 62 is controlled from the time delay relays 17 and 18, closure of one of the relays driving the motor in one direction and of the other relay driving the motor in the other direction. The motor is provided with a worm 63 that meshes with a worm wheel 64. The worm wheel is rigid with a sector contact member 65 which is adapted to engage stationary contacts 66 connected to one side of a series of capacitors 67, the other sides of which are connected by means of the conductor 68 with one side of the line. The other side of the line is connected by means of a conductor 69 with the sector contact member 65. This sector contact member is insulated from the remainder of the apparatus. An insulating projection 70 is adapted to engage one or the other of limit switches 71 at the extreme limits of motion of the sector 65.

In the position of the parts shown in Figure 7 all but one of the capacitors 67 have been connected across the line and this condition would correspond to a very heavy inductive load on the line. If the inductive load increases, an additional capacitor will be connected across the line. If the inductive load decreased, capacitors will be cut out due to a clockwise rotation of the contact sector 65 until substantial balance is again established, thus maintaining a good power factor for the line.

Figure 9:
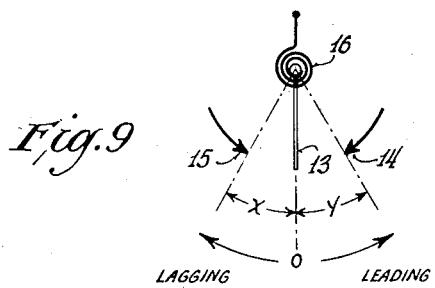
Figure 9 is a diagrammatic view showing one setting of the relay for equal displacement on opposite sides of its spring zero point.
Figure 10:
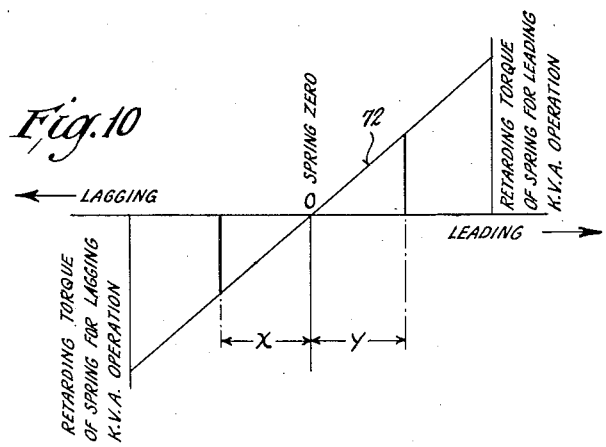
Figure 10 is a diagrammatic view corresponding to the setting of the relay shown in Figure 9.

Figure 9 shows the main relay adjusted so as to require equal values of leading and lagging wattless components of the current. When the contact arm 13 is in its mid-position the spring 16 is unstressed. The diagram of the torque required on opposite sides of center position is shown in Figure 10 and indicated by the line 72. With this adjustment it is apparent that the loci of the current vectors necessary to operate the relay are indicated by the lines 73 and 74 of Figure 11. Any current vector whose end terminates on or outside of the loci 73, 74 will cause operation of the relay. Any current vector which lies wholly within the space between the loci 73, 74 will not cause operation of the relay as its wattless component is not of sufficient magnitude to cause the relay to operate. It may cause the relay to move, but is not of sufficient value to cause the contact arm 13 to move into engagement with one or the other of the contacts 14 and 15. The distance between the loci 73 and 74 can be varied by varying the spacing of the contacts 14 and 15 from zero position, that is, by varying the distances $x$ and $y$ of Figures 9 and 10 and thus requiring a greater or lesser torque to move the contact arm a greater or lesser distance against the spring 16. Also it is to be noted that the contacts 14 and 15 do not have to be equally spaced from the zero point. If the values of $x$ and $y$ are not equal, the loci 73 and 74 will also be unequally spaced above and below the vector indicating the voltage of the line.

Figure 11:
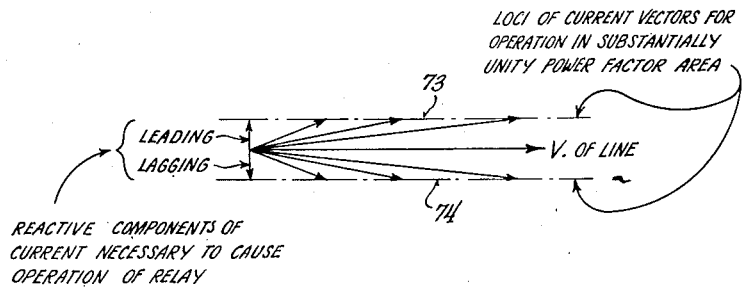
Figure 11 is a vector diagram showing the loci of current vectors for the setting of the relay of Figure 9.

All of the systems employing this invention are inherently stable provided the condenser steps, or the amount of capacity added or taken from the line for any one adjustment is not great enough to cause the current vector to reach or cross the locus 73 or 74 of Figure 11. In other words, the value of the capacity added or subtracted must not produce over compensation.

With the adjustment corresponding to Figures 9, 10 and 11, equal wattless leading and lagging components are required to cause the relay to operate.

The contacts 14 and 15 may be adjusted to cause the relay to maintain lagging current conditions. This adjustment is shown in Figure 12 where the contacts 14 and 15 are both on the lagging side of the spring zero O, thus creating, so to speak, an artificial zero point from which the distances $x$ and $y$ are measured.

Figure 13:
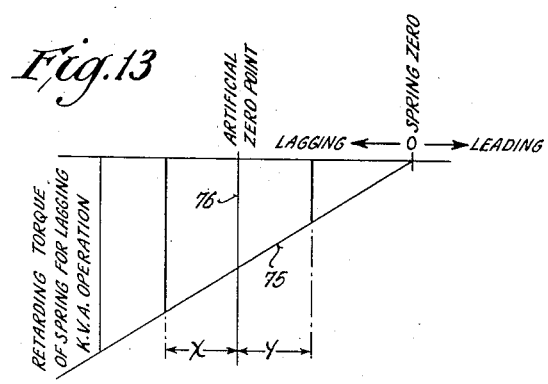
Figure 13 is a diagrammatic view corresponding to the settings of the relay shown in Figure 12.

Figure 13 shows the line 75 indicating the torque of the spring 16 and the line 76 indicating the artificial zero position.

Figure 12:
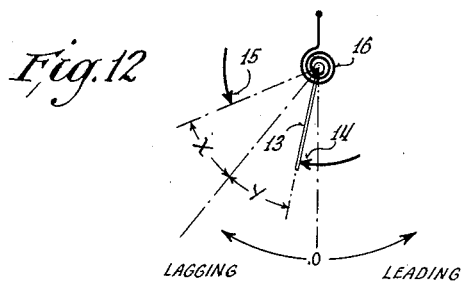
Figure 12 is a diagrammatic view showing the setting of the relay where the spring zero point is to one side of its functional or artificial zero point.
Figure 14:
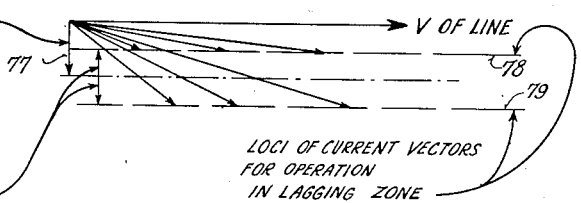
Figure 14 is a vector diagram showing the loci of current vectors for the setting of the relay shown in Figure 12.

From Figure 14 it will be seen that a certain component 77 of lagging current is necessary to maintain the contact arm 13, Figure 12, at its artificial zero point. The loci of the current vectors which correspond to current values that will cause operation of the relay are indicated at 78 and 79. Current values whose vector representation is within the area between the lines 78 and 79 will not operate the relay, but when such vectors terminate either on the line 78 or 79 or in the space outside of such lines operation of the relay will result.

Obviously the contacts 14 and 15 could both be positioned on the right-hand side of the spring zero point of Figure 12 to maintain a leading current condition.

It may be desirable to maintain the system at an average lagging or leading power factor. This is accomplished by the arrangement shown in Figure 15 whose vector diagrams are shown in Figures 16 and 17. In this form of the invention the voltage across the voltage element of the main relay is shifted angularly from a true right angle relation to the voltage of the line.

Figure 15:
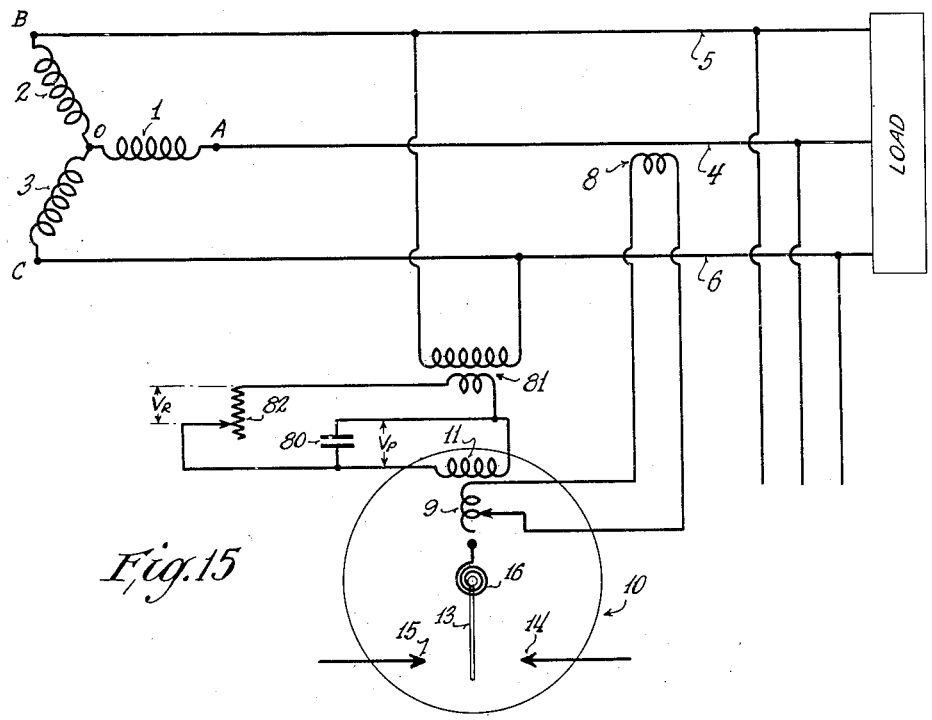
Figure 15 shows a further manner in which the invention may be applied, a three phase system being chosen for the sake of illustration.
Figure 16:
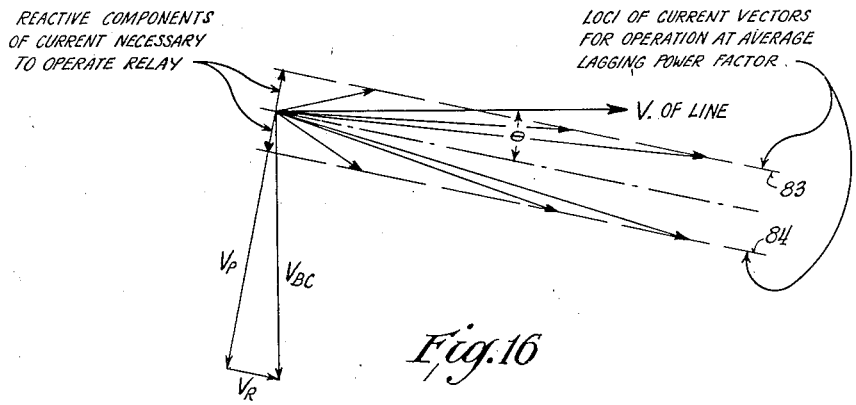
Figure 16 is a vector diagram for the system shown in Figure 15 where the impedance of the condenser is less than the impedance of the voltage element of the relay.

Referring to Figure 15 it will be seen that the voltage coil 11 of the main relay 10 is bridged by means of a condenser 80 and is supplied from the secondary of a step-down transformer 81, the primary of which is connected across the lines 5 and 6. The current coil 9 of the main relay 10 is furnished from a current transformer 8 as shown. A variable resistance or rheostat 82 is in series with the secondary of the transformer 81. The remainder of the system may take any of the forms previously described, suitable time delay relays being controlled from the main relay 10 and in turn controlling the switching in or switching out of capacitors, or any other means of varying the capacity of the line, such as the control of the excitation of an over excited synchronous motor as hereinbefore described.

From an examination of Figure 15 it will be seen that the vector diagram shown in Figure 16 represents the conditions when the reactance of the condenser 80 is less than the reactance of the voltage coil or element 11 of the main relay. The vector $V_{BC}$ is the voltage at the terminals of the secondary of the transformer 81, which voltage is in line with the voltage across the terminals B, C; the coils 1, 2 and 3 representing the secondaries of the supply transformer for the line, the primaries being omitted. The vector $V_P$ represents the potential across the terminals of the voltage coil and $V_R$ represents the voltage drop at the resistance 82. It will be seen that the vector $V_P$ has been shifted clockwise with reference to the vector $V_{BC}$ and consequently the vector $V_P$ is at a slightly greater angle than a right angle with respect to the voltage of the line, which, for the purpose of this discussion, is considered the voltage from the point 0 to the point A of winding 1 of Figure 15. The reactive components of current necessary to operate the relay are indicated in Figure 16 and the loci of current vectors for operation at an average lagging power factor cos $\theta$ are indicated by the lines 83 and 84.

It is apparent from an examination of the vector diagram shown in Figure 17 that the system shown in Figure 15 could be adjusted so that the main relay would respond for an average leading power factor cos $\theta$. This is accomplished by either omitting the condenser 80 or else making the reactance of the condenser 80 greater than the reactance of the voltage element 11 of the main relay. From the vector diagram of Figure 17 it will be seen that $V_{BC}$ is the voltage across the terminals of the secondary of the transformer 81 and the vector $V_P$ the voltage across the potential coil 11 of the main relay 10 and the vector $V_R$ the voltage across the resistance 82. The reactive components of current necessary to operate the relay are indicated in Figure 17 and the loci for the current vectors for operation at an average leading power factor are indicated by the lines 85 and 86.

The diagrams shown in Figures 16 and 17 correspond to a symmetrical adjustment of the stationary contacts 14 and 15 with reference to the spring zero point of the main relay 10. However, it is possible to adjust the contacts 14 and 15 as shown in Figure 12 and still use the system shown in Figure 15 adjusted to give either the equivalent of the operation indicated in Figure 16 or that indicated in Figure 17 combined with that indicated in Figure 14. For example, as shown in Figure 18 the vector diagram corresponds to that shown in Figure 17 in which the vector $V_{BC}$ represents the voltage across the terminals of the secondary of the transformer indicated at 81 in Figure 15. The vector $V_P$ indicates the voltage across the potential coil 11 of the main relay and the vector $V_R$ represents the voltage drop across the resistance 82. Now by shifting the position of the contacts 14 and 15 as shown in Figure 12, an artificial zero point is established so that there is a component of reactive current necessary to maintain the artificial zero. This component is indicated by the vector 87 in Figure 18. The components of current on opposite sides of the artificial zero necessary to operate the relay are also indicated in Figure 18. The loci of current vectors for operating at a power factor which becomes leading for large current values are indicated by the lines 88 and 89 in Figure 18.

It will be seen that the current vectors which will cause operation of the relay gradually change from a generally lagging current condition to a generally leading current condition as the vectors increase in magnitude. Thus as the load on the line increases beyond a predetermined average value, the line becomes condensive and the voltage at the supply end of the line will necessarily rise, thus giving an automatic voltage compensation as well as a power factor correction. This is a very highly desirable characteristic of the invention and at one and the same time provides the double adjustment for correction of power factor and also for the maintenance of an approximate voltage irrespective of increase in load on the line.

It is to be noted that there is no necessity for the use of voltage compensators or other devices of this nature as the invention may be so applied that the automatic correction of the voltage as hereinabove set forth is obtained in addition to the automatic improvement of the power factor. However, all of the systems shown will work whether or not voltage compensators are employed. This is true because of the fact that the main relay is not controlled by voltage variation but is controlled by power factor variation.

In all of the systems it is intended that wherever possible the main relay and the condenser banks will be installed as close to the electrical center of the system as possible, though it is to be understood that they could be placed elsewhere in the electrical system.

It will be seen that a novel method and a novel system of improving the power factor and in certain forms of the invention of improving the voltage regulation has been provided by this invention. A few of the many ways in which the invention can be applied have been illustrated.

It is to be noted also that the systems are inherently stable as previously set forth.

It is to be noted further that the systems are relatively simple and are eminently practical and it is to be noted particularly that an ordinary power line can be converted into the regulated power line hereinabove described with very small change, it being merely necessary to provide for the connecting in of the capacitors or over excited synchronous motor and of the main and auxiliary relays.

While the invention is primarily directed to the control of the capacity effect on the line by switching in or out capacitors or by otherwise varying the capacity effect on the line, nevertheless the invention can be applied to other types of switching if so desired.

In all of the systems it is to be noted that there is a tendency to actuate the movable member of the relay when there is an energy component between the voltage applied to the voltage coil and the current flowing in the current coil of the relay.

It is to be understood that where it is specified that the band defined by the current loci of the line bears an angular relation to the voltage of the line, it is intended that this expression shall mean any angle whether the angle has a value of zero or a plus or minus value.

The expression "power line" is to be interpreted in the ordinary and common manner and is intended to mean the electric line which transmits energy from a source of energy to a load. It is used in the claims to distinguish from what might be called a parasitic line, namely, a line leading from the power line and not delivering energy to the load connected to the power line.

Although this invention has been described in considerable detail, it is to be understood that such description is intended as illustrative rather than limiting, as the invention may be variously embodied and is to be interpreted as claimed.

We claim:

1. A system of control for an electric power line comprising means for varying the capacity of said power line, and a relay having a member movable in opposite directions to increase and decrease, respectively, the effect of said means on said power line, said relay being arranged to respond to the wattless component of the current in said power line and said member being movable in one direction for a lagging wattless component and in the other direction for a leading wattless component.

2. A system of control for an electric power line comprising means for varying the capacity of said power line, and a relay having a member movable in opposite directions to increase and decrease, respectively, the effect of said means on said power line, said relay being arranged to respond to the wattless component of the current in said power line and said member being movable in one direction for a lagging wattless component and in the other direction for a leading wattless component, said relay having spring means tending to hold said member in a predetermined position.

3. A system for improving the power factor of an electric power line comprising a relay having a voltage coil and a current coil and a movable contact member driven from said coils when the current flowing in said current coil has an energy component with the voltage applied to said voltage coil, means for supplying current to said current coil and applying voltage to said voltage coil respectively proportional to the current and voltage of said electric power line with the current in the current coil bearing an angular relation to the voltage applied to the voltage coil when the electric line has unity power factor to make the vector representation of the current in said power line fall between current loci defining a band having a predetermined angular relation to the voltage of said power line, and means controlled by said relay for varying the capacity of said power line to make the said vector representation of the current in said power line fall between the said loci.

4. A system of control for an electric power line comprising means for varying the capacity of said power line, a relay having a movable member movable in opposite directions for controlling said means to increase or decrease the capacity of said power line, said relay having a current coil and a voltage coil controlling the movable member of said relay, and means for supplying current to said current coil and applying voltage to said voltage coil respectively proportional to the current and voltage of said power line with the current in said current coil bearing a vector relation to the voltage applied to said voltage coil approximating but differing from ninety degrees at unity power factor.

5. A system of control for an electric power line comprising means for varying the capacity of said power line, a relay having a movable member movable in opposite directions for controlling said means to increase or decrease the capacity of said power line, said relay having a current coil and a voltage coil controlling the movable member of said relay, and means for supplying current to said current coil and applying voltage to said voltage coil respectively proportional to the current and voltage of said power line with the current in said current coil bearing a vector relation to the voltage applied to said voltage coil approximating but differing from ninety degrees at unity power factor, said relay having spring means biasing said movable member towards motion in one of said directions.

6. A system of control for an electric power line comprising means for varying the capacity of said power line, a relay having a movable member movable in opposite directions for controlling said means to increase or decrease the capacity of said power line, said relay having a current coil and a voltage coil controlling the movable member of said relay, and means for supplying current to said current coil and applying voltage to said voltage coil respectively proportional to the current and voltage of said power line with the current in said current coil bearing a vector relation to the voltage applied to said voltage coil approximating but differing from ninety degrees at unity power factor, said relay having spring means tending to hold said member in a neutral position.

7. A system of control for an electric power line comprising condenser means adapted to be connected across said power line to vary the capacity of said power line by different amounts, motor means for gradually varying the effect of said condenser means on said power line, a pair of time delay relays adapted to selectively function and arranged to cause said motor means to respectively increase or decrease the effect of said condenser means on said power line, and a main relay having movable contact means adapted to move in opposite directions and having stationary contact means on opposite sides of said movable contact means, said movable and stationary contact means selectively controlling said time delay relay means, said main relay being responsive to the wattless component of the current in said power line and arranged to move said movable contact means in opposite directions in response to a leading or lagging current in said power line respectively, said main relay having spring means tending to hold said movable contact means in a neutral position and providing a gradually increasing spring load thereon when said movable contact means is moved in either direction from neutral position.

ROLLAND D. NELSON.
EDWIN A. LINK.

REFERENCES CITED

The following references are of record in the file of this patent:

UNITED STATES PATENTS

| Number | Name | Date |
|---|---|---|
| 1,350,899 | Unger | Aug. 24, 1920 |
| 1,738,344 | Anderson | Dec. 3, 1929 |
| 1,962,943 | Seeley | June 12, 1934 |
| 2,078,667 | Kado | Apr. 27, 1937 |
| 2,243,584 | Toda | May 27, 1941 |
| 2,298,026 | Bany | Oct. 6, 1942 |